United States Patent
Gapontsev et al.

(10) Patent No.: US 9,300,108 B2
(45) Date of Patent: Mar. 29, 2016

(54) HIGH POWER FIBER PUMP SOURCE WITH HIGH BRIGHTNESS, LOW-NOISE OUTPUT IN ABOUT 974-1030 NM WAVELENGTH

(75) Inventors: Valentin Gapontsev, Worcester, MA (US); Igor Samartsev, Westborough, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 291 days.

(21) Appl. No.: 14/239,279

(22) PCT Filed: Aug. 18, 2011

(86) PCT No.: PCT/US2011/048186
§ 371 (c)(1),
(2), (4) Date: Apr. 8, 2014

(87) PCT Pub. No.: WO2013/025218
PCT Pub. Date: Feb. 21, 2013

(65) Prior Publication Data
US 2014/0218788 A1    Aug. 7, 2014

(51) Int. Cl.
*H01S 3/30*    (2006.01)
*H01S 3/067*   (2006.01)
*H01S 3/094*   (2006.01)
*H01S 3/0941*  (2006.01)
*H01S 3/16*    (2006.01)

(52) U.S. Cl.
CPC .......... *H01S 3/06754* (2013.01); *H01S 3/0675* (2013.01); *H01S 3/06729* (2013.01); *H01S 3/06758* (2013.01); *H01S 3/09415* (2013.01); *H01S 3/094003* (2013.01); *H01S 3/094042* (2013.01); *H01S 3/094053* (2013.01); *H01S 3/094069* (2013.01); *H01S 3/1618* (2013.01); *H01S 2301/02* (2013.01)

(58) Field of Classification Search
None
See application file for complete search history.

(56) References Cited

U.S. PATENT DOCUMENTS

| | | | |
|---|---|---|---|
| 7,539,231 B1 | 5/2009 | Honea | |
| 7,701,987 B1 | 4/2010 | Savage-Leuchs | |
| 2005/0008044 A1 | 1/2005 | Fermann | |
| 2009/0274183 A1* | 11/2009 | Kakui | H01S 3/2316 372/31 |
| 2010/0046067 A1 | 2/2010 | Fermann | |
| 2011/0122895 A1* | 5/2011 | Savage-Leuchs | H01S 3/06758 372/10 |

* cited by examiner

*Primary Examiner* — Hemang Sanghavi
(74) *Attorney, Agent, or Firm* — Yuri Kateshov, Esq.; Timothy J. King, Esq.

(57) ABSTRACT

A high power pump ultra bright low-noise source is configured with a multimode ("MM") seed source outputting a MM smooth, low-noise signal light at a desired wavelength in a wavelength range between about 974 and 1030 nm, a MM Yb fiber wavelength converter operative to convert emission of a plurality of high power ("HP") semiconductor laser diodes at a sub-pump wavelength λsp to a pump output at the desired wavelength λρ, wherein $\Delta\lambda=\lambda_\rho-\lambda_{sp}<0/1\lambda_{sp}$. The Yb-doped MM wavelength converter is configured with noise levels substantially identical to those of the low-noise signal light, brightness ("B") substantially equal to П×B, wherein n is a number HP semiconductor laser diodes, and B is brightness of each HP laser diode, and output power ("Po") substantially equal to nPd, wherein Pd is a power of each HP laser diode, and n is the number thereof.

20 Claims, 1 Drawing Sheet

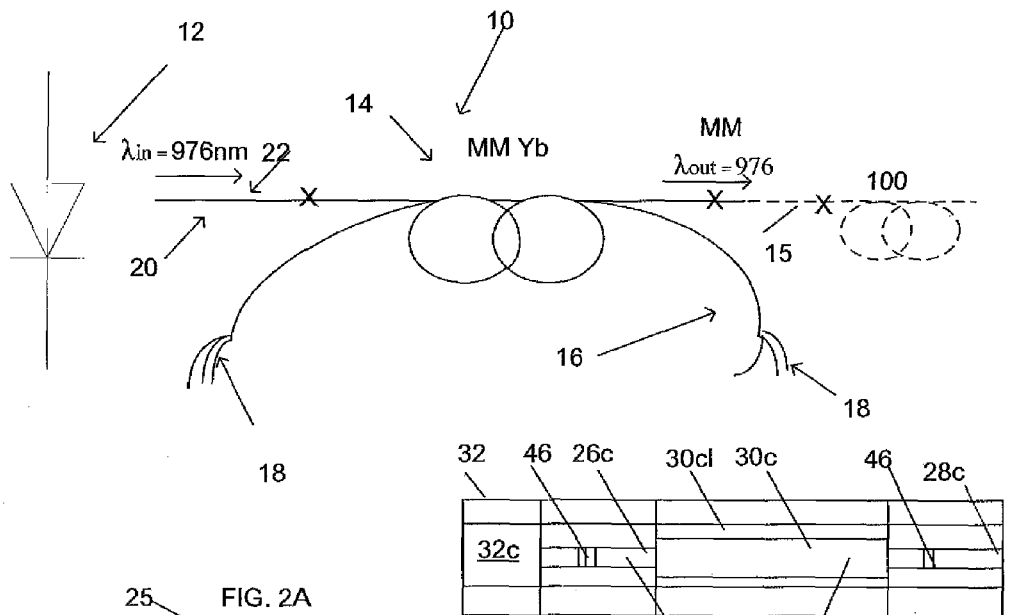
FIG. 1
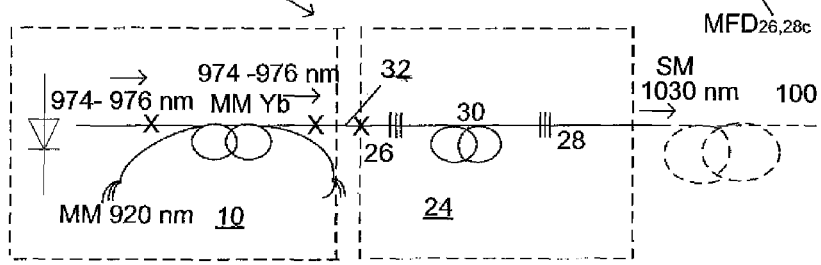
FIG. 2A
FIG. 2B
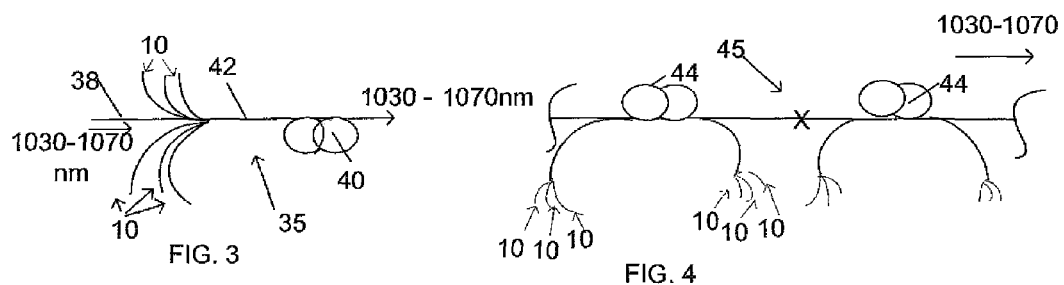
FIG. 3
FIG. 4

HIGH POWER FIBER PUMP SOURCE WITH HIGH BRIGHTNESS, LOW-NOISE OUTPUT IN ABOUT 974-1030 NM WAVELENGTH

BACKGROUND OF THE DISCLOSURE

1. Field of the Disclosure

The disclosure relates to a fiber pump source configured with a MM seed source emitting a smooth low signal light which is coupled to an Yb MM wavelength converter of emission of semiconductor laser diodes to an amplified, ultra bight and low noise pump output in a wavelength band from about 974 to about 1030 nm.

2. Known Art

Fiber lasers including Yb-doped gain fibers are highly efficient, cost-effective, compact and rugged light generating and light amplifying devices. The Ytterbium-based fiber lasers dominate the industrial fiber laser market mainly due to its excellent efficiency and long term stability.

The highest peak absorption in Yb-doped media occurs at about 974-976 nm depending on dopants which are added to the core material. Accordingly, pumping an Yb-doped media at the wavelength as close as possible to the peak absorption wavelength such as 975 nm, has two distinct advantages over other pump wavelengths: shorter fiber lengths of and higher efficiencies of Yb fiber gain blocks. The former is particularly significant because shorter fiber lengths of the pumped Yb gain block are key to limiting deleterious non-linear effects affecting its power scaling. The non-linear effects and other obstacles explained hereinbelow thus may hinder power scaling of high power Yb fiber laser architectures with high beam quality, i.e., high brightness.

To successfully overcome at least some of these obstacles it is necessary that a pump source for HP Yb gain block be configured so as to emit pump light not only having the highest possible pump power, but also the highest brightness and power density, and lowest possible noise level at the peak absorption wavelength.

A viable solution to pump power increase could be the principle of beam combining, which essentially means combining the outputs of multiple laser diodes in a MM combiner so as to obtain a single output beam directly coupled to a pumped Yb gain block. Pump sources based on this principle are further referred to as a MM combiner pump source. While the power output by MM pump sources can be very high neither brightness nor power density nor noise level typically is not markedly improved, if at all.

To improve the brightness of the pump light its divergence should be decreased or/and the beam size should be decreased all through increasing energy per mode in MM radiation of the pump light. The brightness of multiple laser diodes in the MM combiner pump source is however conserved, not improved since there is no further amplification of the pump light emitted by semiconductor lasers.

The increased number of laser diodes, which are necessary for increasing power of a MM combiner pump output, does not come without certain undesirable consequences. The core diameter of the delivery fiber which guides the combiner's output to a gain block should be enlarged with increased powers, otherwise coupling pump light into the delivery fiber causes prohibitively high power losses. Once the core diameter is increased, even with great pump powers, the power density remains substantially the same as before the power was increased. This leads to, at best, the same pump absorption, i.e., the overlap of pump light and active core, in the pumped Yb gain fiber, (further referred to as gain block), remains substantially the same. Without reducing the length of the Yb-doped active fiber, thresholds for nonlinear effects that limit the gain and beam quality are not raised.

Based on the foregoing, a MM combined pump source offers high and very high pump light powers. However brightness and power density of pump light are not beneficiaries of the increased pump light power. Accordingly, an improved fiber pump source outputting high power light in a 974-1030 nm range with great brightness and high power density is needed so as to provide further power scaling and beam quality in Yb gain blocks.

Alternatively, there is always a possibility to configure a pump source including a high power multimode fiber laser which would be able to generate high power pump light at the desired wavelength. However, undesirable power spikes, which are generated in the resonator because a few exited modes interfere with one another—so called speckling effect, may be powerful enough to destroy the laser. But even if the laser is not damaged, its output fluctuates and has a high level of noise which is obviously undesirable.

Thus, there is a need to provide a fiber pump source outputting stable high power, ultra bright pump light in a 974-1030 nm range and in particular at a 975 nm wavelength.

Another need exists for a high power pump source operative to output high power, stable pump light in a 974-1030 nm range with considerably improved brightness by comparison to the known MM combined pump sources.

There is a further need to provide a high power ultra bright fiber pump source outputting pump light in 974-1030 nm range that is characterized by:

a power density in a pump delivery fiber which is at least 10 times higher than currently available power densities available in most powerful MM combiner pump sources, and pump light power levels exceeding currently available power levels.

Still another need exists for a high power fiber pump source with a multimode seed source, outputting a smooth, low-noise signal light, and an Yb-doped wavelength converter which is configured to amplify the signal light so as to output a pump light with noise level, which does not exceed the noise level of the light signal, and brightness that greatly exceeds the brightness of the light signal.

Yet a further need exists for a high power, ultra bright pump source configured with a seed source and a wavelength converter which is operative to convert emission of a plurality of high power semiconductor sub-pump laser diodes at a wavelength $\lambda_{sp}$ to a pump signal at a wavelength $\lambda_p$ so that $\Delta\lambda = \lambda_p - \lambda_{sp} < 0/1\lambda_{sp}$.

SUMMARY OF THE DISCLOSURE

These needs are met by the disclosed here high power, ultra-bright pump source configured to amplify a smooth (spike-less) low noise signal light and output a high power, ultra bright, low noise high density pump light. In particular, the disclosed pump source is operative to output high power, ultra bright, low noise high density pump light in a 974 and 1030 nm wavelength range, and most preferably at a 975 nm wavelength.

The disclosed MM high power, ultra-bright pump source is configured with one or more combined MM seed sources which output a smooth signal light $\lambda p$ preferably at a 975 nm wavelength or any other desired wavelength within a 974-1030 nm range. The MM seed source may be configured as a fiber component or as MM laser diode and output signal light capable of reaching a few hundred watts.

The MM pump source further has an Yb doped MM wavelength fiber converter operative to convert a sub-pump emission at λsp wavelength from a plurality of MM semiconductor laser diodes to the pump light λp, wherein $\Delta\lambda=\lambda_p-\lambda_{sp}<0/1\lambda_{Sp}$.

The MM wavelength converter is also configured to receive and amplify the low noise MM signal light so as to output a bright pump light at the signal light wavelength λp which may reach a kW level but has a noise figure substantially equal to 1. In other words the MM Yb element does not add any additional noise to the signal light. Thus, the Yb-doped MM wavelength converter is configured as an Yb doped MM fiber amplifier which does not add any gain figure to the noise level of the seed signal light but considerably improves its brightness.

The number of MM Yb semiconductor laser diodes, combined to define a pump sub-assembly which emits sub-pump light at the wavelength $\lambda_{sp}$, can be as high as tens of these diodes. Each semiconductor sub-pump diode is capable of outputting a sub-pump light of up to few hundreds watts. Thus the sub-pump is configured to deliver a very powerful sub-pump light to the MM Yb wavelength converter which thus is capable of outputting the ultra bright, low noise pump light at very high power levels.

The pump signal from the MM Yb wavelength converter is coupled into a delivery fiber which has a cross-section which is smaller than a core diameter delivery fibers of MM laser diode combiners of the known art, provided the pump light power is uniform. Accordingly, the pump light, delivered to an Yb gain block, has a high power density which is ten and more times greater than that one delivered in MM combiner-based pump sources of the known prior art under the same conditions. As a consequence the MM pump light of the presently disclosed pump source is not only highly powerful, ultra bright and low noise, but also it has a high density.

The disclosed pump source may be also configured to output high power, bright SM pump light. This configuration also includes a first cascade configured in accordance with the above disclosed source and a SM fiber laser with an Yb-doped fiber. The pump source thus outputs a high power, high brightness and SM pump light.

BRIEF DESCRIPTION OF THE DRAWINGS

The above and other features of the disclosed device will become more readily apparent from the following specific description accompanied by the drawings, in which:

FIG. 1 illustrates the optical schematic of the disclosed MM pump source outputting a high power, ultra-bright MM pump light in a 974-1030 nm wavelength range.

FIG. 2A illustrates the disclosed pump source of FIG. 1 but combined with a single mode Yb laser so as to output a high power, ultra-bright SM pump light in a 974-1030 nm wavelength range.

FIG. 2B illustrates a detailed configuration of the Yb-fiber laser of FIG. 2A.

FIG. 3 illustrates a high power fiber laser system including a plurality of pump systems of FIG. 1 or 2A which are coupled to one another in an end pump configuration.

FIG. 4 illustrates a high power fiber laser system including the disclosed fiber pump system of FIG. 1 or 2 arranged in accordance with a side-pumping technique.

SPECIFIC DESCRIPTION

Referring to FIG. 1, a fiber pump source 10 includes at least one or more combined seeds 12 generating a signal light between about 974 nm and 1030 nm, and a MM wavelength converter 14 receiving and amplifying the signal light so as to output a high power, high brightness pump light. The wavelength converter 14 includes an active fiber which has a multimode core doped with Yb ions and side pumped by sub-pump system 16 which includes a plurality of combined semiconductor laser diodes 18. The latter generate sub-pump light, coupled into converter 14 at a sub-pump wavelength $\lambda_{sp}$, is so selected that $\Delta\lambda=\lambda_p-\lambda_{sp}<0/1\lambda_{Sp}$ wherein $\lambda_p$ is a pump output wavelength (same as a wavelength of the signal light). The closeness of the wavelengths contributes to a high quantum efficiency that, in turn, translates into low heat related losses and high gains of pumped Yb fiber blocks. As disclosed, thus, wavelength converter 14 is operative to convert sub-pump emission at the $\lambda_{sp}$ wavelength to the pump wavelength $\lambda_p$.

The seed 12, for example, is configured as a single or multiple combined powerful pigtailed MM laser diodes or fiber-based seeds generating a smooth, spike-less signal light in a 974-1030 nm wavelength range and preferably at a 975 nm wavelength and with a noise level a root-mean-square (r.m.s.) value of at least about 0.1 m.r.s. The diode also has a NA which ranges between about 0.1 and 0.13. The signal light may have an output power that varies between tens and hundreds of watts. The passive MM fiber 20 receives the generated signal light and guides it further to MM Yb wavelength converter 14. The passive fiber 20 is configured, for example, with a 100 micron or larger MM core diameter. A particular wavelength of signal light, which is thus a wavelength of pump output of source 10, is selected to pump an Yb gain block 100 at a wavelength closest wavelength to the peak of absorption of amplifier 100. The latter may operate in a 1030-1070 nm range. Alternatively, seed 12 may include one or more combined SM fiber lasers.

The MM Yb-doped active fiber of wavelength converter 14 may have a double clad or regular configuration and a core diameter which may vary, for example, within about 50 to 150 microns (or greater) range. The outer diameters of all fibers may be uniform and vary, for example, from about 110 to about 300 micron. The Yb-doped fiber of converter 14 is further configured with a small NA varying between about 0.05 and 0.13.

The output power of pump light Po from wavelength converter 14 can be very high and depends on the number of HP semiconductor laser diodes 18 combined in a sub-pump assembly which, for example, side pumping converter 14 and, of course, the number thereof. Thus the power of pump light Po~N×Pld, wherein N is number of HP laser diodes and Pld—power of each individual diode. Of course, the output power of pump light Po also depends from the power of the signal light, which may be added to the combined power of HO laser diodes. The pump light may be emitted, for example, at a 920 nm wavelength and propagate both along with and counter to the propagation of the signal light. The number of laser diodes may include of up 90 diodes combined together. Each diode may output, for example, a 100 watt pump light. Accordingly, pump source 10 can output a multi kW pump light at a wavelength varying between about 974 nm to 1030 nm. Note that while the sub-pump assembly is shown to side-pump wavelength converter 14, an end pumping configuration including a plurality of laser diodes 18 can be readily realized by one of ordinary skills in the art.

The high power levels of the pump light Po dramatically contribute to the improved brightness ("B") of the pump light compared to those of HP laser diodes and signal light, respectively. The brightness B can be generally equal to Po/BPP, wherein BPP is a beam parameter product which, in turn, can be determined as ½Dc×NA, wherein Dc—core diameter and NA is a numerical aperture. Since the NA is practically the same or smaller than the NA of the signal light, the brightness of the pump output can be at least 10 times greater than that of the most powerful MM combiner of the known art provided the output power is substantially uniform.

The concentration of $Yb^{3+}$ dopants in the core is advantageously relatively low. In accordance with this disclosure, preferably, the concentration of Yb varies between 50 and 100 ppm. But this range may be expanded to about a 10-200 ppm range.

The wavelength converter 14 also has input and output passive fibers (not shown) coupled to respective ends of the Yb-doped fiber, and a delivery fiber 15 guiding the pump light to gain block 100. The delivery fiber typically is configured with a core size similar to that one of the output passive fiber of converter 14 so as to prevent unnecessary losses. An ordinary skilled worker in the fiber laser arts immediately recognizes that the core guiding the pump light in the disclosed system is considerably smaller than that one of a delivery fiber of known MM coupler pump sources, provided the pump powers are substantially the same. This leads to a very high power density of pump light delivered to gain block 100 which may be at least ten and more times grater than known power densities associated with most advanced current pump sources which are known to applicants. The desired frequency and high density of the pump light may considerably reduce the length of active fiber in Yb block 100 which favorably affects its gain and quality of output beam.

The MM wavelength converter 14 is thus configured as a MM fiber amplifier. The level of noise of the amplified pump signal of converter 14 is thus no more than that one of seed source 12 which is low. Such a low noise pump signal also contributes to the improved gain block 100.

The 976 nm wavelength of the pump output is not the only possible wavelength. Other wavelengths longer than the 976 nm wavelength can be easily realized. However, pumping at 976 nm allows shorter fiber lengths of Yb block 100, which is the key to limiting non-linear effects, and its higher efficiencies.

Multiple sources 10 may be combined together and used as stand-alone devices. However, the advantages of the disclosed source 10 become particularly significant in the context of fiber laser systems incorporating source or sources 10 as a pump in different pumping configurations, as disclosed below.

FIG. 2A and 2B illustrate a configuration of high power SM pump source 25 incorporating two or more cascades. The first cascade is configured in accordance with pump source 10 of FIG. 1, and an additional cascade is provided with Yb-doped SM fiber laser 24. The cascades are optically coupled to one another so as to output a single mode pump light at about 1030 nm, for example. The laser 24 is configured with an active silica fiber 30 which has about a 10-20 micron core diameter and a clad with a 50-100 micron diameter. The core 30c of fiber 30 is doped with Yb ions and preferably has a MM core which is capable to support substantially a fundamental mode in the desired wavelength range such as 1 micron range. The laser 24 further has a pair of double-clad passive fibers 26, 28, respectively, each spliced to the end of active fiber 30. The uniformly configured input and output passive fibers 26, 28, respectively, each have a single-mode ("SM") core and a waveguide cladding. The wavelength selection is provided by a couple of fiber Bragg gratings 46 written in respective cores of passive fibers 26 and 28 of laser 24.

The pump source 25 operates in the following manner. A high power, ultra-bright signal light in a 974-976 nm wavelength range from converter 14 is further guided in large MM core 32c (FIG. 2B) of output passive fiber 32 that delivers this light to input passive fiber 26 of laser 24. The waveguide clad of fiber 26 has a diameter substantially equal to the core size of passive fiber 32, such as 100 micron, whereas SM core 26c is provided with a diameter smaller than that one of core 32c. Accordingly, the output signal light at 974-976 nm from pump source 10 further propagates along both the clad and core 26c of input fiber 26. Then the guided light is coupled into active, double-clad, Yb-doped fiber 30 which has a MM core 30c with a diameter typically greater than core size 26c, and a waveguide inner clad 30c1 dimensioned to be substantially the same as the waveguide clad of input fiber 26. The length of active Yb-doped fiber 30 is configured so that the light propagating along clad 30c1 is substantially absorbed in core 30c. Thus, high power fiber pump source 25 can generate a SM high power, ultra-bright pump light at the desired wavelength, such as 1030 nm.

The cores 26c and 30c of respective input passive SM fiber 26 and active Yb-doped MM fiber 30 are configured with mode field diameters ("MFD") that substantially match one another. When the light guided by core 26c is coupled into core 30c, it excites only a fundamental mode, as disclosed in U.S. Pat. Nos. 5,422,897 and 5,774,484 which are co-owned with the present disclosure by the same assignee and fully incorporated herein by reference.

Depending on the diameter of core 32c of MM output fiber 32 and core 26c of SM input fiber 26, instead of the above-disclosed configuration, it is possible to use ordinary optical fibers to generate a SM, ultra-high brightness and high power pump light. To realize the latter, it is necessary to taper the end of passive fiber 32 so that the tapered end has a geometrical diameter substantially match that one of SM passive input fiber 26. Then, of course, it is possible to utilize active fiber 30 having a true SM core. The disclosed above 1030 wavelength of laser 24 is only exemplary and depends on the filtering parameters of the FBGs.

FIG. 3 illustrates one of possible applications of pump source 10 of FIG. 1 or 25 of FIG. 2A in a ultra-high power fiber laser system 35 provided with an upgraded Yb-doped amplifier 40. In particular, high power fiber laser system 35 includes a plurality of pump sources 10 combined together in a bundle. A central SM signal delivery fiber 38, guiding a signal in a 1015-1070 nm wavelength range extends through the bundle and is optically connected to surrounding pump systems 10. The output fiber 42 of the combined pump sources and central signal fiber delivers the signal light into an upgraded Yb fiber amplifier 40 in accordance with en end pumping technique. The upgraded fiber amplifier 40 is configured to output a high power beam in substantially a fundamental mode in the desired 1015 and 1070 nm wavelength range. If desirable, a polarization maintaining fiber can be used in the illustrated system.

FIG. 4 illustrates another configuration of the disclosed pump systems 10 in a high power fiber laser system 45. Here, a plurality of pump groups each including multiple high power, ultra bright fiber laser pump systems 10 of FIG. 1 or 25 of FIG. 2A and an upgraded YB amplifier 44 define a side pumping arrangement. The pump systems 10, for example, of each group are combined together so as to have a single output fiber guiding pump light from the combiner at the desired wavelength to upgraded fiber amplifier 44. The upgraded Yb fiber amplifier may output an ultra high light in a substantially single fundamental or low mode output in 1015-1070 nm range. Both example shown at respective FIGS. 3 and 4 feature upgraded high power amplifiers which are pumped with a high power, bright pump signal whose emission wavelength substantially coincides with a given absorption peak. Because of the latter, as one of ordinary skills in the laser arts readily realizes, in the schematics shown in respective FIGS. 3 and 4, the length of the active fiber of the upgraded amplifier is substantially reduced, whereas a threshold for nonlinear effects is raised.

Having described at least one of the preferred embodiments of the present invention with reference to the accompanying drawings, it is to be understood that the invention is not limited to those precise embodiments. For example, the disclosed pump sources can be integral parts of CW and pulsed laser systems. Various changes, modifications, and adaptations including different wavelengths, fiber parameters and rare-earth dopants may be effected therein by one skilled in the art without departing from the scope or spirit of the invention as disclosed above.

The invention claimed is:

1. A high power ultra-bright pump and low noise source ("HPUBLNS"), comprising:
   at least one seed source generating a low-noise signal light a wavelength $\lambda p$;
   a plurality of high power ("HP") semiconductor laser diodes combined together to radiate sub-pump emission at a sub-pump wavelength $\lambda sp$; and
   an Yb-doped multimode ("MM") fiber wavelength converter of the sub-pump emission at the sub-pump wavelength $\lambda sp$ to a pump output at the wavelength $\lambda p$ which is configured to emit a pump output at the wavelength $\lambda p$ and having:
      a noise level substantially identical to those of the low-noise signal light,
      a brightness ("B") substantially equal to n×B, wherein n is a number HP semiconductor laser diodes, and B is brightness of each HP laser diode, and
      an output power ("Po") substantially equal to nPd, wherein Pd is a power of each HP laser diode, and n is the number thereof.

2. The HPUBLNS of claim 1 further comprising a delivery fiber with a core receiving and guiding the amplified low noise pump output, the core of the delivery fiber being configured with a core diameter smaller than that one of a MM combiner pump source, provided the MM combiner pump source emits an output light with a power substantially equal to the pump output, wherein the brightness of the pump output is at least in 10 (ten) or more times greater than brightness of the output light of the MM combiner.

3. The HPUBLNS of claim 1, wherein the wavelength converter is configured so that the amplified low noise pump output has a root-mean-square (r.m.s.) value at most 0.1% m.r.s.

4. The HPUBLNS of claim 2, wherein the seed source has a configuration selected from a group consisting of one or more combined MM pigtailed laser diodes and one or more SM fiber oscillators.

5. The HPUBLNS of claim 1, wherein the sub-pump wavelength $\lambda_{sp}$ varies between about 910-975 nm wavelength range.

6. The HPUBLNS of claim 4, wherein the wavelength converter is configured with a MM YB doped fiber and input and output passive MM fibers which are spliced to respective opposite ends of the Yb-doped fiber and have a uniform core diameter which is substantially equal to the core diameter of the delivery fiber spliced to the output passive fiber.

7. The HPUBLNS of claim 1, wherein the semiconductor laser diodes are configured to end-pump the wave-length fiber converter or side pump the wavelength fiber converter.

8. The HPUBLNS of claim 1, wherein a numerical aperture of the Yb wavelength converter ranges between about 0.05 and about 0.13, whereas a numerical aperture of the MM seed source varies between about 0.1 and about 0.13.

9. The HPUBLNS of claim 1 further comprising a SM Yb-doped optical fiber oscillator receiving the amplified low-noise pump light and operative to generate a SM light output at a wavelength greater than the pump output wavelength $\lambda p$.

10. The HPUBLNS of claim 9, wherein the SM Yb optical oscillator includes:
    a double clad Yb-doped fiber with a MM core which is configured to support substantially a single, fundamental mode in a desired wavelength range,
    spaced double-clad input and output passive fibers spliced to respective opposite ends of the Yb-doped fiber and having respective single-mode cores, and
    a pair of fiber Bragg gratings each provided in the SM core of the passive fiber so that the Yb laser outputs the SM pump light in the fundamental mode in an about 1015-1030 nm wavelength range.

11. The HPUBLNS of claim 6, wherein the core of the Yb-doped fiber of the MM wavelength converter has a core diameter of up to about 300 μm.

12. The HPUBLNS of claim 1 further comprising at least one additional HPPS, wherein the plurality of HPUBLNSs are optically combined to end pump an Yb gain block.

13. The HPUBLNS of claim 1 further comprising at least one additional HPPS, wherein multiple HPPLNSs are optically combined to side pump an Yb gain block.

14. The HPUBLNS of claim 1, wherein the wavelength converter has an Yb-doped MM fiber configured with an Yb-ion concentration ranging between about 10 and 200 ppm.

15. The HPUBLNS of claim 2 wherein the core of the delivery fiber is at least of 50 micron.

16. The HPUBLNS of claim 1, wherein $\Delta\lambda=\lambda_p-\lambda_{sp}<0.1\lambda_{sp}$, where $\lambda_p$—is the wavelength of pump output and $\lambda_{sp}$ is the sub-pump wavelength.

17. A high power ultra-bright lows noise pump source ("HPUBLNS"), comprising:
    at least one seed source generating a spike-less low-noise signal light; and
    an Yb-doped multimode ("MM") fiber wavelength converter of emission of a plurality of pump laser diodes at a sub-pump wavelength $\lambda_{sp}$ to a pump output at a wavelength $\lambda_p$, wherein $\lambda_{sp} \# \lambda_p$, the MM wavelength converter being configured to amplify the signal light so that the pump output has brightness substantially exceeding brightness of and a noise level at most equal to that one of the low-noise signal light.

18. The HPUBLNS of claim 17 further comprising a SM Yb-doped optical fiber oscillator receiving the amplified pump output and operative to generate a SM light source output at a wavelength greater than the pump output wavelength $\lambda p$.

19. The HPUBLNS of claim 18, wherein the SM Yb optical oscillator includes:
    a double clad Yb-doped fiber with a MM core which is configured to support substantially a single, fundamental mode in a desired wavelength range,
    spaced double-clad input and output passive fibers spliced to respective opposite ends of the Yb-doped fiber and having respective single-mode cores, and
    a pair of fiber Bragg gratings each provided in the SM core of the passive fiber so that the Yb laser outputs the SM pump light in the fundamental mode in an about 1015-1030 nm wavelength range.

20. The HPUBLNS of claim 18, wherein the seed has a configuration selected from pigtailed laser diodes or one or mode SM fiber oscillators.

\* \* \* \* \*